April 27, 1926.

U. PAVESI 1,582,428

VEHICLE WHEEL AND TRACTION DEVICE THEREFOR

Filed March 11, 1924

Inventor
U. Pavesi,
By Marks & Clerk
Attys.

Patented Apr. 27, 1926.

1,582,428

UNITED STATES PATENT OFFICE.

UGO PAVESI, OF MILAN, ITALY.

VEHICLE WHEEL AND TRACTION DEVICE THEREFOR.

Application filed March 11, 1924. Serial No. 698,544.

*To all whom it may concern:*

Be it known that I, Ugo Pavesi, a subject of the King of Italy, residing at 18 Via Oglio 18, Milan, in the Kingdom of Italy, have invented certain new and useful Improvements in Vehicle Wheels and Traction Devices Therefor, of which the following is a specification.

This invention relates to improvements in vehicle wheels and has for its object to provide a wheel structure including, in addition to the usual resilient tire, a plurality of traction devices which are permanently attached to the wheel and movable relative to the resilient tire in such manner that when the condition of the road-way does not necessitate their use they may be quickly and conveniently moved to a position lying within the resilient tire, but which, when mud or other poor road-way renders the resilient tire ineffective, may be moved to a position overlying the tread portion of the resilient tire where they will materially improve the traction qualities of the wheel.

A further object of the invention is the provision of means for effectively locking the traction device in its operative and inoperative positions.

In the accompanying drawing wherein an approved embodiment of the invention is illustrated Fig. 1 is a fragmentary side elevation of a wheel constructed in accordance with the invention.

Figure 1:
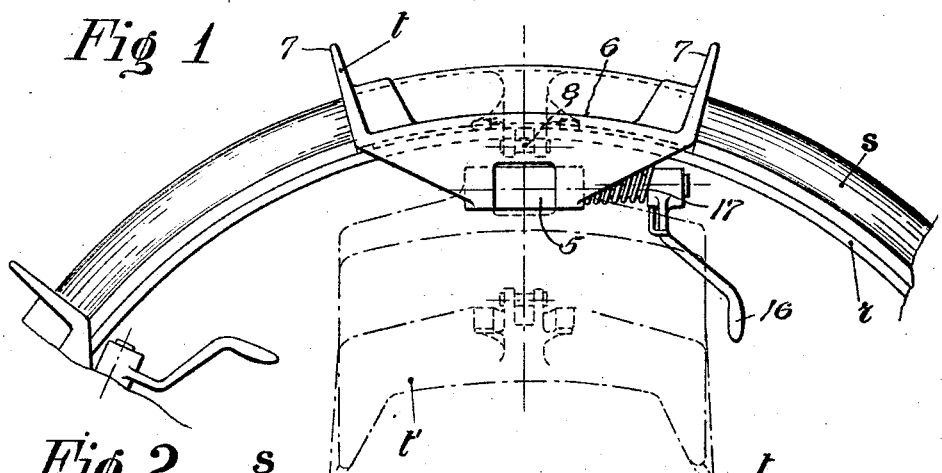
Figure 2:
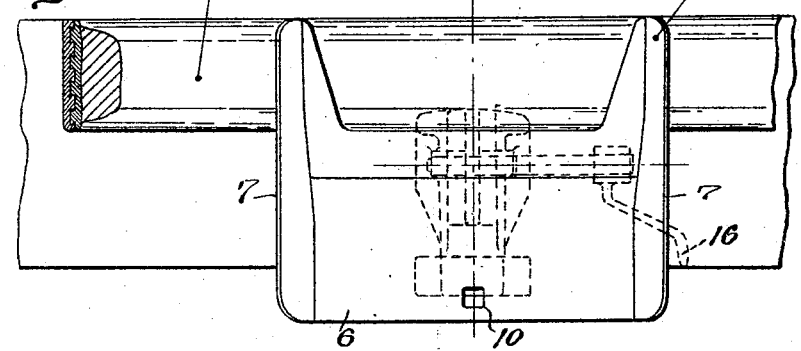
Figure 2 is a fragmentary plan view of a wheel and traction device.

Referring to the drawing in detail $r$ indicates the felly or rim of the wheel which supports the preferred type of the resilient tire $s$. The rim $r$ of the present wheel is of a somewhat greater width than ordinarily provided for the size of the tire $s$ which the wheel carries so as to provide a laterally projecting portion $r'$. At uniformly spaced points around the rim the portion $r'$ thereof is provided with a plurality of inwardly projecting brackets 5 carrying pivot ends $u$ on which are pivotally mounted the traction devices $t$.

Each traction device includes a body 6 and spaced blade-like extensions 7 which project from the body 6 and lie in planes radial to the axis of the wheel. As shown in full lines in the drawing, each traction device $t$ when moved to operative position overlies and rests upon the tread of the tire $s$ but when swung inwardly the traction device occupies a position wholly within the wheel rim so as to permit the vehicle to be supported entirely upon the resilient tire $s$.

Figure 3:
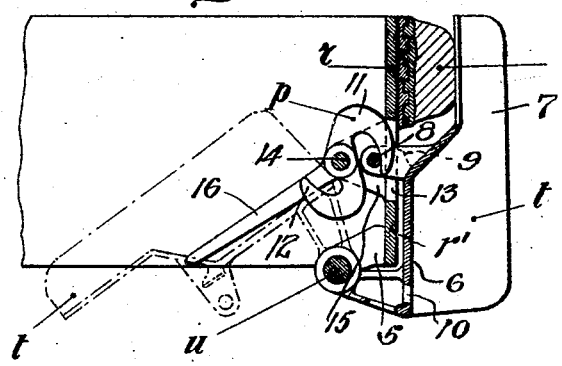
Figure 3 is a transverse sectional view through the rim of the wheel and one of the traction devices.

In order to lock the traction devices in either of their two positions, each is provided with a pin 8 projecting laterally from a lug 9 and with an aperture 10 formed in a portion of the body 6 lying adjacent the pivot $u$. Openings 13 are formed in the wheel rim $r$ through which the lugs 9 and pins 8 project when the devices are moved to operative position. A double hook member 11—12 carried by a shaft 14 journalled in brackets 15 formed internally of the rim $r$ is associated with each traction device $t$. For convenience in manipulating the double hook retaining member a handle 16 is attached to one end of the shaft 14 and is connected with a coil spring 17 arranged about the shaft and normally tending to turn the latter in a direction to engage the beaks $k$ of the hooks 11 and 12 with the pins 8 or the apertures 10 respectively. When the poor condition of the road-way necessitates the use of the traction device, the latter are moved to a position shown in full lines in the drawing by partially rotating each shaft 14 so as to remove the hooks 11 from the path of the pins 8. Having engaged each traction device with the tread of the tire $s$ the shaft 14 is turned by means of the handle 16 until the curved beak of the hook 11 engages the pin 8 and thereby locks the attachment device in operative position. After the release of the handle 16 by the hand of the operator the shaft 14 is prevented from turning back so as to disengage the hook 11 from the pin 7 by the tension of the spring 17. When further use of the traction device is unnecessary, each of the latter is swung upwardly upon its pivot $u$ to the position shown in broken lines in Figs. 1 and 3 having first turned the shaft 14 so as to disengage the hook 11 from the pin 8 and to displace the hook 12 from the path of the traction device $t$. When each traction device assumes the position indicated in Fig. 3 the shaft 13 is turned so as to engage the beak 12 in the aperture 10, in which case the hook 12 urged by the spring 17 acting upon the shaft 14 effectively retains the traction device in its inoperative position.

Having now described my invention and how the same is to be carried out, what I claim as my invention is:

1. In a wheel structure, a rim, a tire carried by said rim, a traction device, and means securing the traction device to the wheel and permitting said device to be moved from a position lying within the wheel rim to a position overlying the tread of the tire.

2. A wheel structure as claimed in claim 1 characterized by the provision of means for releasably locking the traction device in either of its two positions.

3. A device as claimed in claim 1 characterized by the provision of a rotatable member and means connected by the rotatable member and engageable with the traction device for locking the latter in either of its two positions.

4. In a wheel structure, a rim, a tire carried by said rim, a traction device pivotally secured to the rim and removable from a position lying within the plane of the rim to a position overlying the tread of the tire.

5. A wheel structure as claimed in claim 4 characterized by the provision of means for locking the traction device in either of its two positions.

6. A wheel structure as claimed in claim 4 characterized by the provision of means for locking the traction device in either of its two positions, and means resiliently retaining the locking means in operative position.

7. A wheel structure as claimed in claim 4 characterized by the provision of means for locking the traction device in either of its two positions, said means including a rotatable shaft, and a pair of hooks carried by the shaft respectively engageable with portions of the traction device when the latter is moved from one position to the other.

In testimony whereof I hereunto affix my signature.

ENG. UGO PAVESI.